May 16, 1961
J. M. TUCKER ET AL
2,984,523
ENDLESS TRACK FOR VEHICLES
Filed Oct. 22, 1958
3 Sheets-Sheet 1
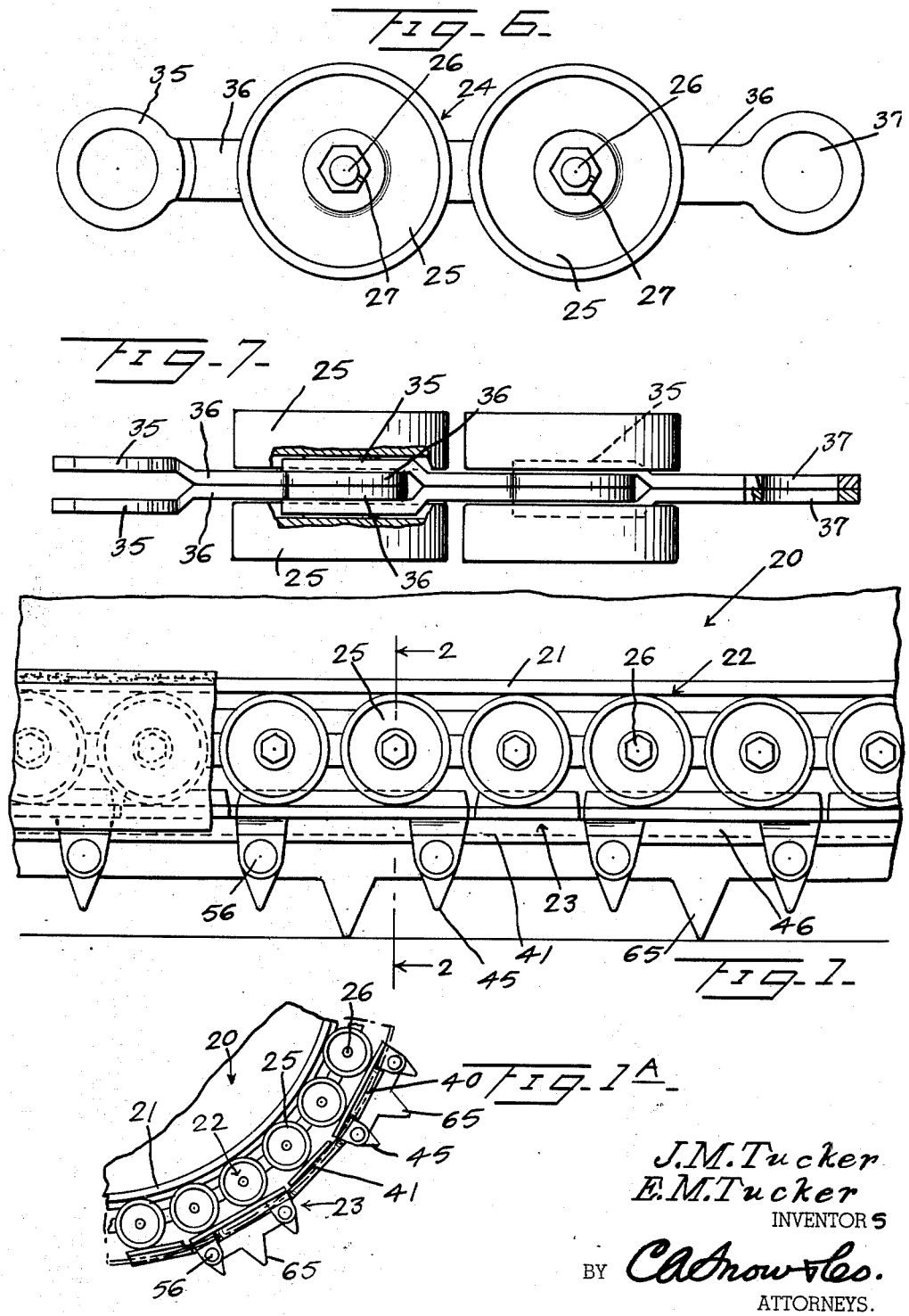
J.M.Tucker
E.M.Tucker
INVENTORS
BY
ATTORNEYS.

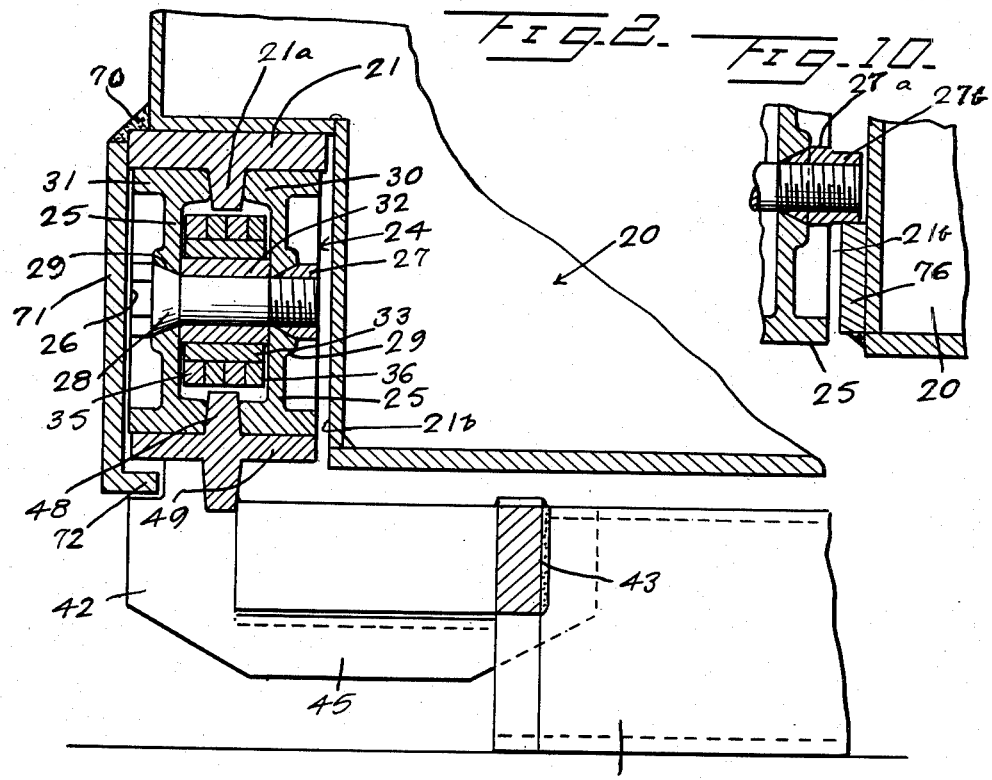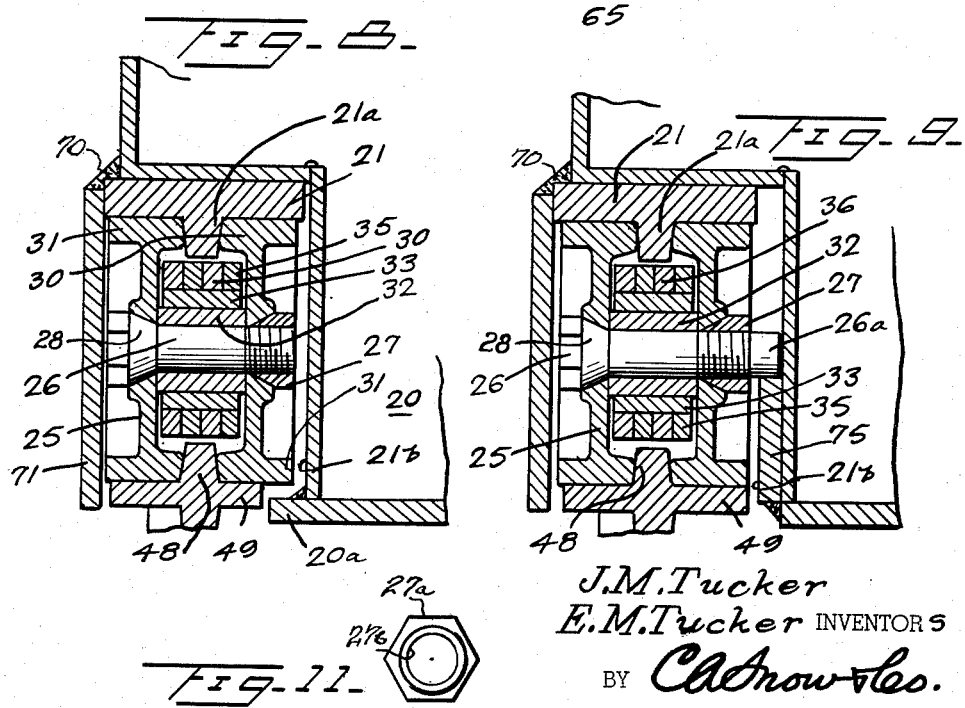

May 16, 1961  J. M. TUCKER ET AL  2,984,523
ENDLESS TRACK FOR VEHICLES
Filed Oct. 22, 1958  3 Sheets-Sheet 3
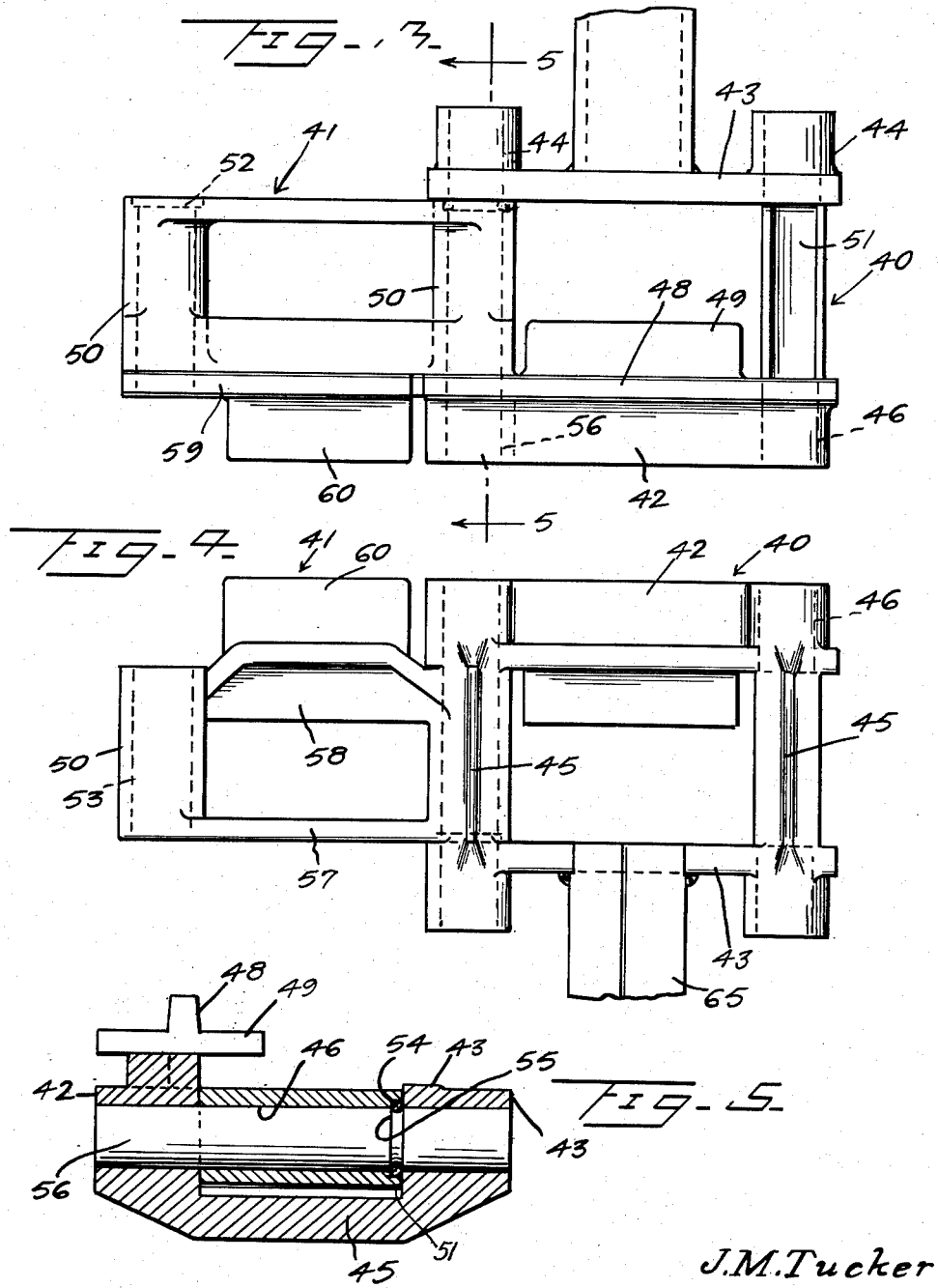
J.M.Tucker
E.M.Tucker
INVENTORS
BY *Ca Snow & Co.*
ATTORNEYS.

United States Patent Office 2,984,523
Patented May 16, 1961

2,984,523

ENDLESS TRACK FOR VEHICLES

Joseph M. Tucker, Medford, and Emmitt Marcus Tucker, Ashland, Oreg., assignors to Tucker and Sons (Inc.), Grass Valley, Calif., a corporation of California Filed Oct. 22, 1958, Ser. No. 768,862

4 Claims. (Cl. 305—17)

This invention relates to an endless track for vehicles, and comprises an improvement over our co-pending application of the same title, Serial No. 726,526, filed April 4, 1958.

As conducive to a clearer understanding of this invention it may here be pointed out that in field trials of the endless track for vehicles described in the above mentioned co-pending application, which field trials were in part carried out on the Antarctic continent in conjunction with the Geophysical Year expedition, certain deficiencies in the use and operation of the track described in the previous application, commonly known as "bugs," were discovered.

As a result of these "bugs" certain modifications were made in the endless track, which modifications resulted in the improvements disclosed in the present application.

As illustrative of such deficiencies it was found that the single link connection between adjacent rollers of the endless roller belt of the previous application were subject to excessive wear, and binding during the operation of the vehicle under such circumstances, for example, as the picking up of a lump of ice, rock or frozen dirt, which would tend to jam one or more of the rollers, and as a result of such jamming would occasion tension on the links between the rollers. Since the previous links acted directly on the rollers, this resulted in the binding or locking of one or more rollers, or alternatively in excessive wear of the eye of the link, which caused the link to fail in a relatively short time.

By virtue of the instant invention the rollers are now provided with a primary bushing, which serves as a main axle for each individual roller, and a secondary bushing freely rotatable about the first bushing, which serves to take up any lateral binding force exerted on the axle of the roller, whereby the roller is free to rotate regardless of the longitudinal tension exerted on the roller belt.

An important object of the invention is, therefore, the provision of such a means which will preclude binding on the rollers, and which will reduce wear on the connecting links therebetween to a minimum.

Another difficulty of the previously described construction was occasioned by the fact that the overlapping angled track shoes tended, upon the passage of the endless track about the ends of the associated pontoons to spread, leaving a relatively wide space between adjacent angled ends, which space frequently picked up lumps of ice, rock or other debris, and occasioned jamming of the track.

A further important object of the invention is the provision of an improved track shoe characterized by relatively closely mating sections, so that, upon the passage of the track shoes about the bend in the pontoon carrying the same, no such gap as in the previous application is permitted.

In connection with these track sections, it was also found that the links connecting adjacent track shoes of the former application were subject to wear, since the individual connecting links were relatively thin, and that furthermore no provision was made in the connecting links for a continuous T-shaped track to engage the rollers.

An additional object of the present invention is the provision of an intermediate linking section, which connects adjacent track shoes, the linking section being also provided with a T-shaped rail, upon which the rollers of the endless roller belt are adapted to ride.

In the use of the device it was further found, that when the pontoon rode over an obstruction, such as a log, or the like, portions of the track, which might have developed a certain amount of slack during use fell below the level of the enclosing trackway, and that when such intermediate portion of the pontoon ceased to be airborne, upon contact with the ground, in the reengagement of the endless roller belt with the T-shaped track carried by the pontoon, disalignment sometimes occurred, causing buckling of the belt, which resulted in malfunction.

An additional important object of this invention is the provision of means for insuring the engagement of the track shoes and their associated rollers with the rails at all times whether in contact with the surface of the ground in bearing a load, or when portions of the pontoon are airborne, as previously mentioned.

In a modified form of the invention there is provided means which will preclude the gravity drop of the endless roller belt out of its associated trackway even when the belt is airborne over a space in which it is not in contact with the ground, to insure permanent alignment of the roller belt with the T-shaped rail carried by the pontoon at all times.

Still other objects of the invention reside in the combinations of elements, arrangements of parts, and features of construction, all as will be more fully pointed out hereinafter, and disclosed in the accompanying drawings wherein there are shown preferred embodiments of this inventive concept.

Still other objects will in part be obvious, and in part be pointed out hereinafter and shown in the accompanying drawings wherein:

Figure 1 is a fragmentary side elevational view of a portion of a pontoon for a track vehicle, showing a fragment of an endless roller belt, and its associated track sections.

Fig. 1A is a view similar to Fig. 1 on a reduced scale but showing a portion of the endless roller belt and its associated track sections as going about a curve in the pontoon.

Fig. 2 is an enlarged sectional view taken substantially along the line 2—2 of Fig. 1 as viewed in the direction indicated by the arrows.

Fig. 3 is a top plan view of one of the track sections, on an enlarged scale, and its associated linking member.

Fig. 4 is a bottom plan view of the construction as shown in Fig. 3.

Fig. 5 is a sectional view taken substantially along the line 5—5 of Fig. 3 as viewed in the direction indicated by the arrows.

Fig. 6 is a side elevational view of a pair of the rollers of the endless roller belt showing their associated connecting links.

Fig. 7 is a top plan view of the construction of Fig. 6, parts thereof being sectioned for the sake of clarity of illustration.

Fig. 8 is a view similar to Fig. 2, on a reduced scale but showing a modified form of construction.

Fig. 9 is a similar view showing a still further modified form of construction, and, Fig. 10 is a fragmentary view similar to a portion of Fig. 9, but disclosing a still further modified form of construction.

Fig. 11 is a detail front elevational view of a portion of the structure of Fig. 10.

Similar reference characters refer to similar parts throughout the several views of the drawing.

Having reference now to the drawings in detail, and more particularly to Figs. 1 and 1A, there is generally indicated at 20 a fragment of a pontoon, which is adapted as a supporting means for a vehicle having particular utility in traveling over snow, ice, muskeg or the like, all as more fully disclosed in our above mentioned co-pending application.

The pontoon 20 includes a pair of peripheral channels 21b around opposite sides thereof, in each of which is fixed a T-shaped track rail 21 which extends entirely about the periphery thereof, which are adapted to support free running endless chains of rollers, generally indicated at 22, the rollers being adapted in turn, to support a plurality of linked together track sections forming an endless belt, and generally indicated at 23.

The pontoons 20 comprise a portion of a vehicle, and may be of any suitable number, as for example two or four, and each pontoon is surrounded entirely on each side thereof by the channel containing the endless T-shaped track rail 21.

The rail 21 is adapted to carry a plurality of rollers, indicated by the reference character 22 as an endless belt of rollers, each roller 24 comprising two similar or identical half sections 25, which are connected, as best shown in Fig. 2 by means of a bolt 26, and a nut 27. The bolt is provided with a tapered portion 28, and a similar tapered portion 29 on the nut 27 provides a clamping action in the tapered sockets 29 of the opposite half sections of the roller 25. It should here be pointed out that each roller is provided with inwardly extending flanges 30, as well as outwardly extending flanges 31, the inwardly extending flanges 30 being adapted to engage on opposite sides of the stem 21a of the T-shaped rail 21 which extends about the body of the pontoon.

The nut 27 is preferably provided with a split portion in order that a clamping or locking effect may be achieved when the nut is tightened on the bolt. Surrounding the bolt 28 at its unthreaded center portion is a bushing or bearing sleeve 32, about which is positioned a second stationary or static bushing or bearing sleeve 33. It is to be noted that the bushing or bearing sleeve 32 is very slightly longer than the bushing or bearing sleeve 33, in order that when the bolt 26 and the nut 27 are clampingly engaged with the roller sections 25, that no lateral friction is imposed on the second bushing or bearing sleeve 33. Surrounding the bushing or bearing sleeve 33 are a pair of eyes 35, which are offset relative to extending link portions 36 of roller connecting links. The link portions 36 are also provided with eyes 37, which are adapted to surround the static bushing 33 of the next adjacent roller.

The arrangement is, as best shown in Fig. 7, that a pair of outer sections 35 and their associated eyes surround the bushing or bearing sleeve 33 of a roller 25, exteriorly of the eyes 37 of link portions 36, which extend in between the outer portions. By virtue of this arrangement of links, twisting torque of an individual link is avoided, in turning the chain, and by virtue of the static bushing or bearing sleeve 33 regardless of the longitudinal pressure exerted on the chain, by locking of an intermediate point, each individual roller assembly is free to turn about its movable bushing or bearing sleeve 32.

The endless track which moves about the endless roller belt is comprised of a plurality of track sections generally indicated at 40, which are connected by links generally indicated at 41, as best shown in Figs. 1, 3, 4 and 5. Each track section comprises a pair of side portions 42 and 43, which are connected by transverse members 44, each of which is provided on its under side with a cleat portion 45, which is adapted to dig into the snow or turf over which the vehicle is travelling. Each portion 44 is provided with a central bore 46, and on its upper side each link portion 42 carries a T-shaped rail including a stem portion 48 and a head portion 49.

Each link portion 41 includes two transverse members 50, each of which has an internal bore, the transverse members 50 being dimensioned to fit in a cut-away portion 51 in the members 40, so as to form a continuous chain, to be engaged by the drive sprocket, not shown, but which is encased in the pontoon in the usual and well known manner. A cut-away peripheral recess 52 is provided at each end of the internal bore 53 in each transverse member 50 and is adapted to be engaged by a split clamping ring 54 which seats in a groove 55 in a locking pin 56, the pin being adapted to engage through the bores 46 and the cut-away portion 51 of the members 44, and through the bores 53 and the members 50 to form a continuous chain link. The link members are also provided with side pieces 57 and 58, the portion 58 being provided with a T-shaped cross head similar to the previously described portion of the members 40, which includes a stem 59 and flanges 60, upon which the rollers of the endless roller belt are adapted to ride. Opposite sections 40 on opposite sides of the pontoon are connected by triangular transverse members 65, to provide a track surface, the members being adapted to ride near the under side of the pontoons 20.

Means are provided for retaining the endless roller belt in related assembly with the pontoon, and take the form, as shown in Fig. 2 of the channel 21b in the side of the pontoon, in which is positioned the T-shaped track 21, the latter being secured in position as by welding 70 or the like. A mudguard or flange 71 extends downwardly over the outsides of the rollers 25, and extends beneath the flange 49 of the track sections 40 and 41, having an inturned edge 72, which serves to secure the track flange, and hold the same within the recess 21b regardless of whether weight is resting on the particular portion of the track or not.

A modified form of construction is disclosed in Fig. 8, wherein the recess 21b is provided at its inside with an extension 20a of the bottom of the pontoon 20 which underlies the outer flange 31 of the inside roller 25. In this modified form one side of the flange 49 and the corresponding flange 60 on the links 41 is slightly cut away to insure clearance, the extension 28 serving the same purpose as the extension 72 in the foregoing modification.

Fig. 9 discloses a still further modified form of construction wherein the bolt 26 is provided with an extending end portion 26a, which extends beyond the nut 27 and is smooth, which portion rides on a flange 75 which extends interiorly of the recess 21b in the pontoon 20 and completely about the recess or track for the purpose of supporting the ends of all of the bolts, and consequently their associated rollers.

In Fig. 10 a similar arrangement is provided but in this case the nut 27a is provided with an elongated round portion 27b, which rides on a flange 76 similar to the flange 75 and for a similar purpose.

From the foregoing it will now be seen that there is herein provided an improved endless track for vehicles, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What we claim is:

1. In an endless track for vehicles, the combination of a substantially fluid tight pontoon having substantially flat sides, and a peripheral channel around each side, a T-shaped track rail secured in each channel, an endless belt of free running inter-connected rollers in each channel, an endless track extending around each endless belt and rotatable independently of the rotation of said belt, each of said endless tracks comprising a plurality of interconnected T-shaped track sections, elongated transverse connecting members connected to the opposite track sections, each of said rollers including a pair of opposed flanged roller disks, an inner spacer sleeve between said disks, an outer bearing sleeve freely rotatable on said inner spacer sleeve, the outer bearing sleeve being of a length slightly less than the length of the inner spacer sleeve to preclude lateral friction from said disks, and bolt means extending through said inner spacer sleeve inter-connecting said roller disks.

2. In an endless track for vehicles, the combination of a substantially fluid tight pontoon having substantially flat sides, and a peripheral channel around each side, a T-shaped track rail secured in each channel, an endless belt of free running inter-connected rollers in each channel, an endless track extending around each endless belt and rotatable independently of the rotation of said belt of free running rollers, each said track comprising a plurality of interconnected T-shaped track sections, the opposite track sections being connected by elongated transverse members, and means for retaining said endless belts of free running rollers and said endless track sections in said channels when a portion of said channels are temporarily out of contact with the ground surface.

3. In an endless track for vehicles, the combination of a substantially fluid tight pontoon having substantially flat sides, and a peripheral channel around each side, a T-shaped track rail secured in each channel, an endless belt of free running inter-connected rollers in each channel, an endless track extending around each belt and rotatable independently of the rotation of said belt, each said track comprising a plurality of inter-connected T-shaped track sections, the opposite tracks being connected by transverse connecting members, and each of said rollers including a pair of opposed flanged roller disks, an inner spacer sleeve between said disks, an outer bearing sleeve freely rotatable on said inner spacer sleeve, the outer bearing sleeve being of slightly less length than the inner spacer sleeve to preclude lateral friction from said disks, bolt means extending through said inner spacer sleeve interconnecting said roller disks, and means for retaining each said endless belt in its associated channel when a portion thereof is out of contact with the ground, said last mentioned means comprising an unthreaded extending inner end on each bolt means and a flange secured to the inner underside of each channel on which said unthreaded ends ride.

4. An endless track for vehicles, the combination of a substantially fluid tight pontoon having substantially flat sides, and a peripheral channel around each side, a T-shaped track rail secured in each channel, an endless belt of free running inter-connected rollers in each channel, an endless track extending around the endless belt of rollers and rotatable independently of the rotation of said belt of rollers, each track comprising a plurality of interconnected T-shaped track sections, elongated transverse connecting bars connecting opposite track sections, each of said rollers including a pair of opposed flanged roller disks, an inner bearing sleeve between said disks, an outer bearing sleeve freely rotatable on said inner bearing sleeve, the outer bearing sleeve being of a slightly less length than the inner sleeve, to preclude lateral friction from said disks, and bolt means extending through said inner sleeve interconnecting said roller disks, each of said T-shaped track sections comprising a pair of side portions, one forming a T-shaped rail connected by transverse hollow end portions including cut away upper central portions and lower center cleat portions, and links connecting each track section to the adjacent track section.

References Cited in the file of this patent
UNITED STATES PATENTS

| | | |
|---|---|---|
| 1,364,020 | Barletta | Dec. 28, 1920 |
| 1,640,331 | Heaslet | Sept. 6, 1927 |
| 2,070,015 | Linn | Feb. 9, 1937 |
| 2,206,966 | Law | July 9, 1940 |
| 2,852,317 | Riemerschmid | Sept. 17, 1958 |